United States Patent [19]

Shallenberger et al.

[11] Patent Number: 4,800,061

[45] Date of Patent: Jan. 24, 1989

[54] APPARATUS FOR LOADING FUEL RODS INTO GRIDS OF NUCLEAR FUEL ASSEMBLIES

[75] Inventors: John M. Shallenberger, Fox Chapel Borough; Stephen J. Ferlan, Wilkins Township, Allegheny County, both of Pa.

[73] Assignee: Westinghouse Electric Corp., Pittsburgh, Pa.

[21] Appl. No.: 46,475

[22] Filed: May 6, 1987

[51] Int. Cl.⁴ .............................................. G21C 21/00
[52] U.S. Cl. ...................................... 376/261; 29/723
[58] Field of Search ............... 376/261, 260, 902, 446, 376/463; 29/723, 400 N, 423, 450

[56] References Cited

U.S. PATENT DOCUMENTS

| | | | |
|---|---|---|---|
| 3,222,773 | 12/1965 | Zambrow et al. | 29/474.3 |
| 3,604,100 | 9/1971 | Tindale et al. | 29/433 |
| 3,740,825 | 6/1973 | Buyken et al. | 29/433 |
| 3,748,713 | 7/1973 | Tindale et al. | 29/200 P |
| 3,757,403 | 9/1973 | Bleiberg | 29/424 |
| 3,795,040 | 3/1974 | Jabsen | 29/433 |
| 3,892,027 | 7/1975 | Jabsen | 29/200 P |
| 4,218,813 | 8/1980 | Cather, Jr. | 29/450 |
| 4,427,622 | 1/1984 | Knecht et al. | 376/260 |
| 4,450,609 | 5/1984 | Hamilton | 29/156.4 R |
| 4,579,274 | 4/1986 | Anspach et al. | 29/400 N |
| 4,651,403 | 3/1987 | DeMario et al. | 29/723 |
| 4,673,544 | 6/1987 | Rohr | 376/261 |
| 4,729,867 | 3/1988 | DeMario | 376/261 |
| 4,740,351 | 4/1988 | Katsumizu et al. | 376/446 |
| 4,747,997 | 5/1988 | Boatwright | 376/261 |

FOREIGN PATENT DOCUMENTS

| | | | |
|---|---|---|---|
| 0978668 | 11/1975 | Canada | 376/902 |
| 0711780 | 10/1941 | Fed. Rep. of Germany | 29/241 |
| 2560423 | 8/1985 | France | 376/261 |
| 0066184 | 6/1977 | Japan | 376/902 |
| 53-11294 | 1/1978 | Japan | 376/261 |
| 0218996 | 12/1984 | Japan | 376/261 |
| 0015591 | 1/1985 | Japan | 376/902 |
| 0050490 | 3/1985 | Japan | 376/261 |
| 0067891 | 4/1985 | Japan | 376/261 |
| 2100692 | 5/1987 | Japan | 376/902 |

Primary Examiner—Deborah L. Kyle
Assistant Examiner—Daniel Wasil
Attorney, Agent, or Firm—K. Bach

[57] ABSTRACT

The invention relates to apparatus and a method for facilitating a scratchless insertion of a fuel rod into cellular grids of a nuclear fuel assembly.

The apparatus comprises a thin-walled tubular member having an inner diameter substantially corresponding to the outer diameter of a fuel rod, and having a longitudinal slit formed in its wall so as to render the latter resiliently deflectable in a diameter-reducing sense. The method comprises the steps of mounting the thin-walled tubular member in position for protectively enveloping the fuel rod during insertion thereof; inserting the fuel rod into the grids while the tubular member is in place to envelope it; and withdrawing the tubular member from the inserted fuel rod.

14 Claims, 11 Drawing Sheets

FIG. 3
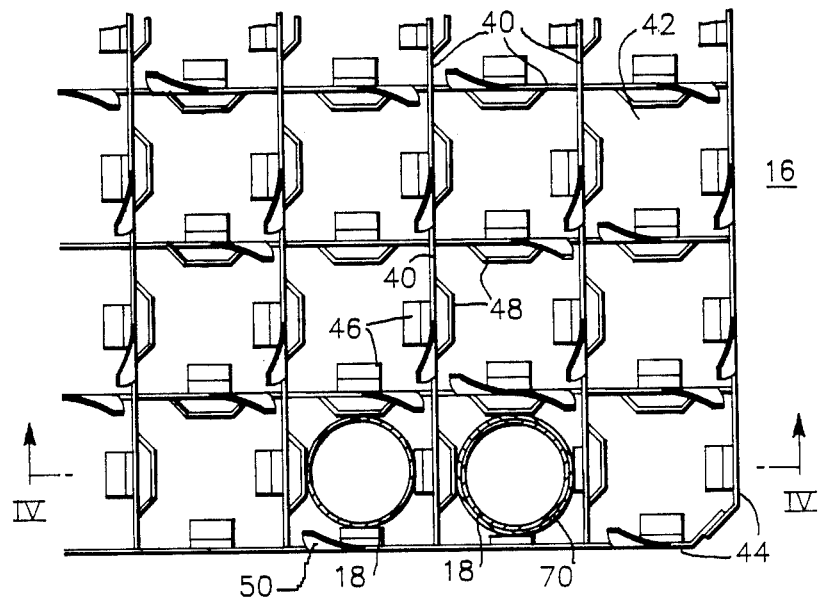
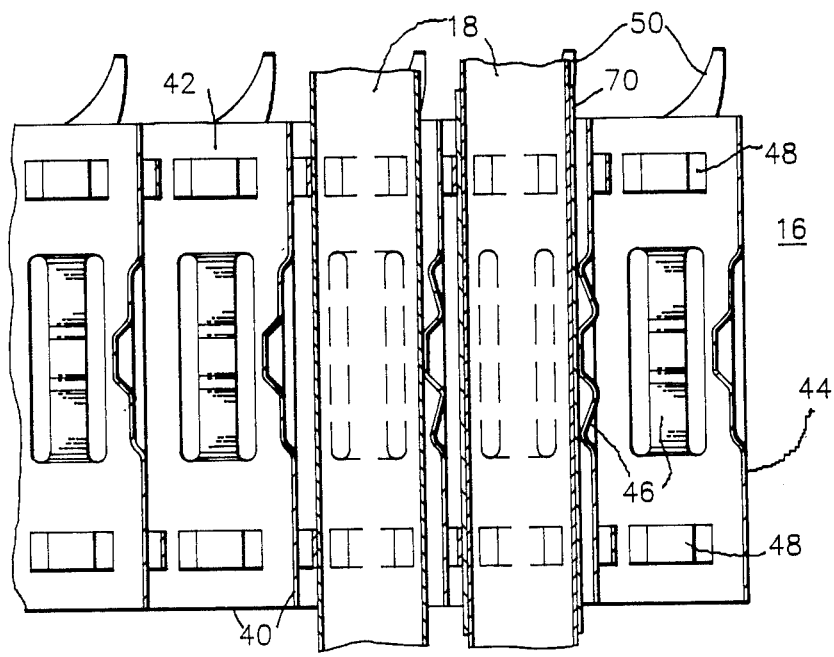
FIG. 4

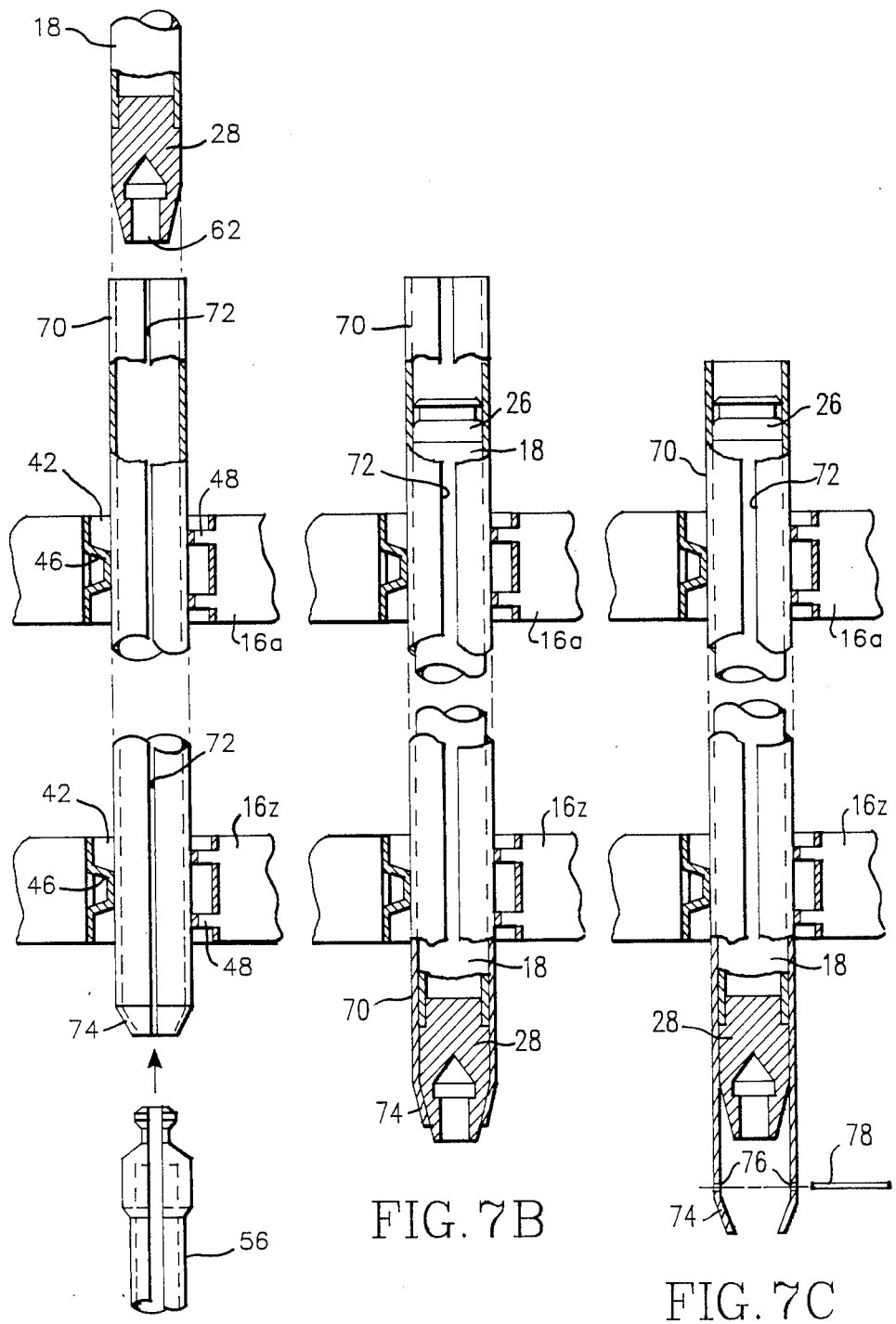

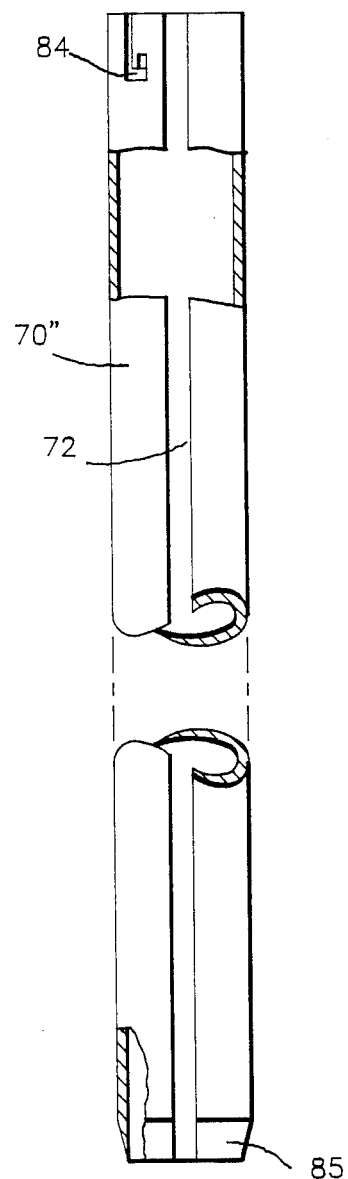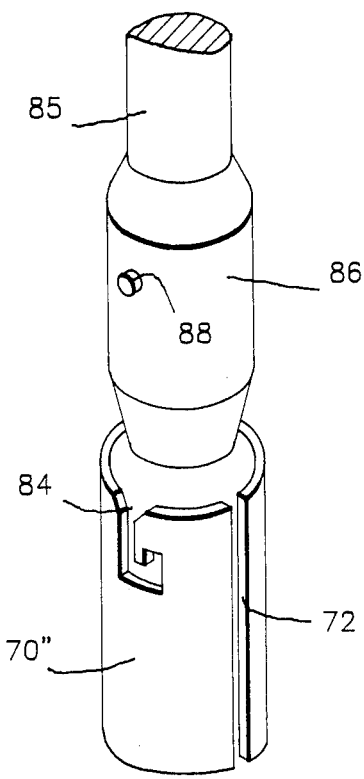
FIG. 11
FIG. 10

APPARATUS FOR LOADING FUEL RODS INTO GRIDS OF NUCLEAR FUEL ASSEMBLIES

CROSS-REFERENCE TO RELATED APPLICATIONS

Reference is hereby made to the following copending U.S. patent applications concerning related subject matter and assigned to the assignee of the present invention:

"Apparatus and Method for Loading Fuel Rods into Grids of a Fuel Assembly" by E. E. DeMario et al, assigned U.S. Ser. No. 717,263 and filed Mar. 28, 1985, now U.S. Pat. No. 4,651,403.

"Spring Retainer Apparatus and Method for Facilitating Loading of Fuel Rods into a Fuel Assembly Grid" by E. E. DeMario, assigned U.S. Ser. No. 881,996 and filed July 3, 1986, now U.S. Pat. No. 4,729,867.

BACKGROUND OF THE INVENTION

The present invention relates generally to nuclear fuel assemblies and, more particularly, to an apparatus and a method for facilitating scratchless loading of fuel rods into a fuel assembly.

Most nuclear reactors utilize cores composed of elongate, upright fuel assemblies each comprising a unitary structure, or skeleton, and a plurality of fuel rods or pins loaded into the skeleton and supported therein in a predetermined array and in parallel spaced relationship with respect to each other. Usually, support for the fuel rods is provided by transverse grids which form part of the skeleton and are spaced from each other therealong, each such grid being constructed of plates or straps interlaced in an egg-crate-like manner to define open cells through which the individual fuel rods extend. The straps have formed thereon detents which protrude into the respective cells so as to engage the fuel rods therein and to hold them against vibration and against lateral displacement such as could result in localized neutron flux peaking and, consequently, in hot spots. The detents associated with each cell usually comprise springs and dimples formed from the metal of the strap portions defining the walls of the cell, as disclosed in U.S. Pats. No. Re. 28,079 to Andrews et al, and 3,920,515 to Ferrari et al, for example, or they may comprise only dimples arranged in sets, as disclosed in copending U.S. patent application, Ser. No. 729,387 of J. A. Rylatt, filed May 1, 1985, and assigned to the present assignee.

In order that such detents can perform their intended function effectively, they are designed to exert upon the fuel rods a considerable restraining force, such as 8 to 10 lbs. (ca. 3.6 to 4.5 kg). This force, while beneficial on the one hand, poses a problem on the other, namely, one arising during loading of the fuel rods into the skeleton when the fuel rods slide over the detents in moving therepast and thereby might be scratched. Scratches in the outer surfaces of fuel rods tends to induce and aggravate corrosion of the fuel rod cladding during use. Moreover, scratching of fuel rods has been observed to result in a buildup of fine chips scraped from the cladding surface and accumulating in the grid cells, there to form so-called "gall balls" which will fret against, and may eventually even fret through, the cladding of fuel rods extending through the affected grid cells. Moreover, if gall balls collect at cell springs, they can cause abnormal spring deflection lessening the restraining force exerted by the springs upon the fuel rods; and if such gall-ball buildup occurs at springs located in peripheral cells of a support grid, it can result in spring deformation causing the springs abnormally to protrude outward from the peripheral grid straps and beyond the grid boundary. Of course, chips scraped from the cladding of fuel rods and accumulating in grid cells also reduce the free cross-sectional area of the cells and, hence, impair the flow of reactor coolant therethrough.

The problem of fuel rod scratching is well recognized in the art, and various endeavors have been made to overcome it. Thus, U.S. Pat. No. 3,757,403 (Bleiberg) proposes to subject fuel rods, prior to their insertion into the grids of a fuel assembly, to a cooling treatment carried out in a humid atmosphere and in a manner such as to form, on each fuel rod to be inserted, a hoarfrost-like coating intended to act as a lubricant during the insertion of the fuel rod, a function which of course the hoarfrost-like coating can perform only so long as it remains intact and is not removed by the grid-cell detents bearing against the fuel rod as it is being inserted through the cells of successive grids.

Another technique intended to permit scratchless fuel-rod insertion is disclosed in U.S. Pats. Nos. 3,795,040 and 3,892,027 (both to Jabsen) which propose first to insert a rod-like spring retractor of generally square transverse cross-section through axially aligned cells of the grids; then to partially rotate the spring retractor about its longitudinal axis in order to cam fuel-rod supporting detents on resilient wall portions of the grid cells out of the path of the fuel rod to be inserted; thereafter to lock the detent-bearing cell wall portions in their deflected positions by means of bar-shaped keys first inserted laterally into the grid cells through cut-outs in the straps or plates of the respective grids, and then turned to locking positions; thereafter to withdraw the spring retractor from the cells and to insert the fuel rod into them; and finally to turn the keys to unlocking positions and to withdraw them from the grid cells, thereby enabling the detent-bearing cell wall portions to resiliently return to their normal positions and, hence, enabling the detents thereon to engage the fuel rod.

In Japanese Patent Document No. 53-11294, there is disclosed an assembly made of stainless steel and comprising a unitary member which consists of an end block and, extending therefrom, four thin armoring strips which are similar in length to a fuel rod and are cylindrically arrayed in quadrature and in parallel spaced relationship with respect to each other. Prior to insertion of a fuel rod into a fuel assembly, the fuel rod is placed between the thin armoring strips, the distal ends of which are then fixed in position by means of a holding ring placed round the strips and the fuel rod, and a fixing ring applied to the holding ring. Thereafter, this whole assemblage is inserted into the fuel assembly by axially moving it through serially aligned cells of the support grids while, at the same time, carefully maintaining the four armoring strips aligned with and protectively sandwiched between the respective grid-cell detents and the fuel rod cladding. When insertion is complete, the entire assemblage is rotated about its longitudinal axis to an extent calculated to slide the armoring strips laterally from between the fuel rod and the respective detents applying the fuel-rod restraining force, whereupon the holding and fixing rings are removed from the one end of the fuel rod, and the unitary member consisting of the end block and the strips then is ready to be withdrawn from the other end, provided that all of the armoring strips have in fact come free of the detents and still are straight, undistorted and flat against the inserted fuel rod.

In the present assignee's copending first patent application initially cross-referenced herein, there is disclosed an arrangement for facilitating the loading of fuel rods into a fuel assembly, comprising first means insertable axially into the cells of the spacer grids of the fuel assembly so as to deflect the springs therein to retracted positions, and second means insertable laterally into the respective grids so as to hold the deflected springs in their retracted positions upon withdrawal of the first means and during insertion of the fuel rods, the movements of the first and second means being linear. Finally, the present assignee's second patent application initially cross-referenced herein discloses a spring retainer apparatus designed for use in retracting detents in the form of grid springs which are arranged in pairs, with the springs of each pair disposed back-to-back with respect to each other and protruding each into one of two adjoining grid cells.

These earlier techniques, with the exception of the one relying upon the formation of hoarfrost-like deposits as lubricants, require the use and manipulation of several independent parts and elements, and each is designed for use with a particular configuration of fuel-rod detents employed in the support grids. Thus, there exists a need for a different approach, one which is not subject to these limitations, and the present invention has for its prinicipal object to satisfy this need.

SUMMARY OF INVENTION

Accordingly, the invention provides improved ways and means for facilitating the scratchless insertion of a fuel rod into cells of support grids forming part of a nuclear fuel assembly and including detents for resiliently engaging and laterally supporting fuel rods inserted into the cells.

The invention, from one aspect thereof, resides in the provision of a thin-walled tubular member adapted to be received in said cells so as to have its thin wall interposed between said detents and the fuel rod during insertion of the latter, said thin-walled tubular member having an inner diameter substantially corresponding to the outer diameter of the fuel rod, and a longitudinal slit formed in the wall thereof so as to render said wall resiliently deflectable in a diameter-reducing sense.

From another aspect thereof, the invention resides in a method of inserting a fuel rod into cells of said support grids, comprising the steps of mounting the aforesaid thin-walled tubular member in position to protectively envelope the fuel rod during insertion thereof; inserting the fuel rod, with said tubular member in position to envelope it, into said cells of the support grids; and axially withdrawing the tubular member from the inserted fuel rod.

The thin-walled tubular member according to the invention is a unitary element capable of affording the desired protection without requiring the use of any additional parts needing to be handled separately. Moreover, the protective tubular member according to the invention is not limited in its applicability to any particular detent configuration, and inserting it into grid cells entails virtually no risk of causing spring detents within the cells to be deflected outwardly to such an extent as to impair their ability to fully recover.

In the method according to the invention, the steps of mounting the tubular member in position and of inserting the fuel rod preferably consist in first inserting the tubular member into the cells of the support grids, and then inserting the fuel rod into the inserted tubular member.

Alternatively, these steps may consist in first disposing the tubular member telescopically upon the fuel rod, and then inserting the tubular member together with the fuel rod disposed therein into the cells of the support grids.

Inserting the tubular member before the fuel rod affords a special advantage in situations where the grid cells intended to receive the fuel rod have associated therewith mixing vanes of the kind ordinarily provided on fuel-assembly grids for the purpose of promoting the mingling of coolant flow along the fuel rods. If employed with such grids, the initially inserted tubular member will protect the mixing vanes from being bumped and damaged by the fuel rod as well as protect the fuel rod from being scratched by the detents within the grid cells. In this context, it should be noted that insertion of the tubular member by itself, that is to say, without a fuel rod inserted therein, is made possible by the single longitudinal slit which extends throughout the length of the tubular member and, during insertion of the latter, enables the detents within the grid cells to readily deflect the wall of the tubular member, yet which slit does not impair the structural integrity and stability of the tube wall to a degree rendering it vulnerable to distortion or buckling under the compression force longitudinally acting upon the tubular member when pushed into the cells of a whole complement of support grids. Moreover, the longitudinal slit has a width which is sufficient to preclude overlapping of the edges of the tube wall along the slit but insufficient for any of the detents to enter the slit, and the wall of the tubular member being, apart from the slit, essentially solid so that there is virtually no risk of any circumferential displacement of wall material occurring such as could result in a widening of the longitudinal slit to an extent enabling grid-cell detents to invade the slit and to penetrate to the cladding surface of the fuel rod being inserted.

If a fuel rod is to be loaded into grids which have no mixing vanes or, if they do, where interference of the vanes with the fuel rod being inserted is unlikely to occur due either to the particular design and/or placement of the mixing vanes or to the shape of the lower end plug of the fuel rod (i.e. the plug at the end of the fuel rod which is its leading end during insertion thereof), it may be desirable to use the second or alternative approach mentioned above which permits both the fuel rod and the protective tubular member to be inserted simultaneously and, as described in detail later herein, permits fuel-rod insertion and subsequent withdrawal of the protective tubular member to be carried out in one continuous operation.

BRIEF DESCRIPTION OF THE DRAWINGS

Preferred embodiments of the invention will now be described, by way of example only, with reference to the accompanying drawings, in which:

FIG. 3 is an enlarged, fragmentary, sectional view of one of the support grids, as taken along line III—III in FIG. 1, with all but two of the fuel rods omitted and showing one of the two fuel rods as extending through a protective tubular member;

FIG. 4 is a sectional view taken along line IV—IV in FIG. 3;

FIGS. 7A–C schematically depict different phases in utilizing the protective tubular member of FIG. 7 for inserting a fuel rod into the grids of the fuel assembly, only the uppermost and lowermost grids of which are indicated;

FIG. 10 is a view similar to FIG. 7 but showing a further modification of the protective tubular member;

FIG. 11 is an enlarged, isometric partial view of an upper end portion of the protective tubular member of FIG. 10, and of a lower end portion of a tool used for withdrawing the protective tubular member from an inserted fuel rod;

DESCRIPTION OF THE PREFERRED EMBODIMENTS

Figure 1:
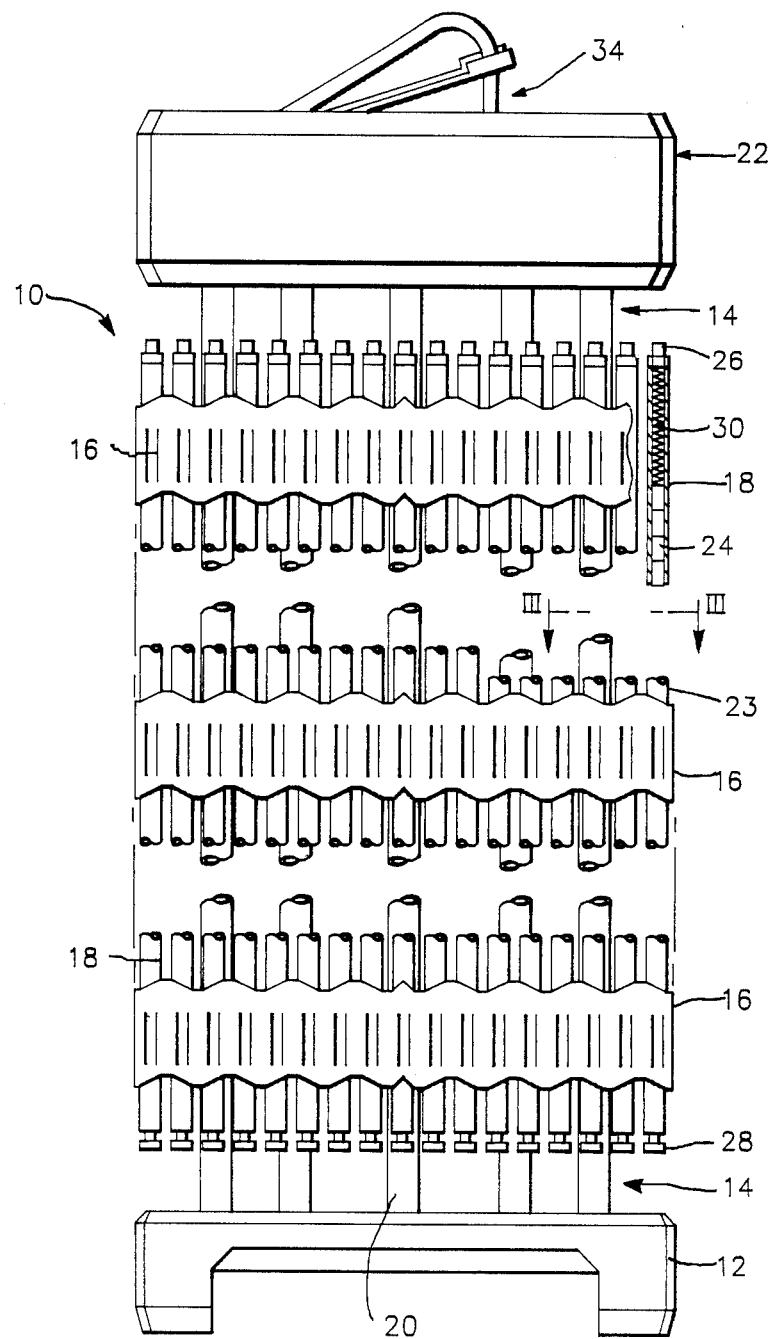
FIG. 1 is an elevational view, partly in section, of a conventional fuel assembly shown vertically foreshortened and with parts broken away for clarity.

Referring now to the drawings, and to FIG. 1 in particular, the fuel assembly illustrated therein and generally designated with reference numeral 10 is of the kind commonly employed in pressurized water reactors. Basically, it comprises a lower end structure or bottom nozzle 12 adapted to support the fuel assembly on the lower core plate (not shown) of a nuclear reactor, guide tubes or thimbles 14 connected to the bottom nozzle 12 and extending longitudinally upwards therefrom, transverse support or spacer grids 16 spaced from each other along the guide thimbles 14 and fastened thereto, an instrumentation tube 20 extending longitudinally through the center of the fuel assembly, and an upper end structure or top nozzle 22 attached to upper end portions of the guide thimbles 14. These parts all together form an integral unit known as the skeleton of the fuel assembly. The complete fuel assembly includes an array of fuel rods 18 loaded into the skeleton, in a manner to be described later herein, and supported by the grids 16 in parallel spaced relationship with respect to one another. Each fuel rod 18 comprises a cladding tube 23 which is hermetically sealed at its opposite ends by means of end plugs 26,28, and nuclear-fuel pellets 24 contained in the cladding tube and held firmly stacked therein by means of a pressure spring 30 interposed between the upper end plug 26 and the stack of fuel pellets 24. During reactor operation, the fuel pellets, composed of fissile material, are the source of energy generated in the form of heat which is extracted from the reactor core by means of a liquid moderator/coolant, such as water or water containing boron, circulated therethrough. Fissioning is controlled by means of control rods (not shown) which are connected to a control mechanism 34 mounted in the top nozzle 22 and operable to effect axial movement of the control rods into and out of preselected ones of the guide thimbles 14, all as well known in the art.

Figure 2:
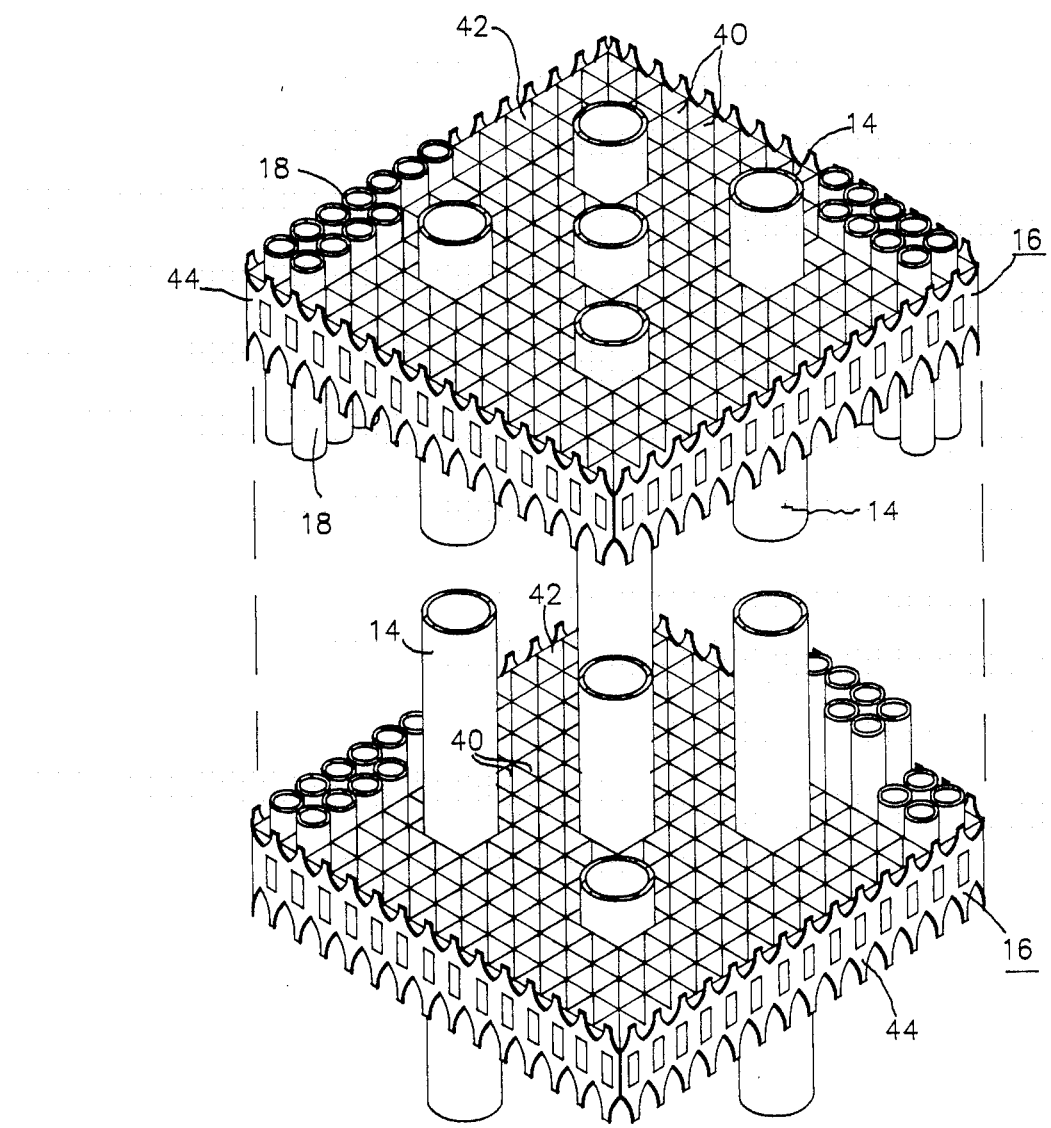
FIG. 2 is an isometric partial view of the skeleton of the fuel assembly, illustrating two support grids and portions of fuel rods inserted through some of the grid cells.

Only some of the support grids 16 of the fuel assembly 10 are shown in FIG. 1. Typically, there would be eight or ten, each comprising, as illustrated in FIGS. 2, 3 and 4, and cellular structure composed of a plurality of inner straps 40 interlaced and joined together in an egg-crate-like manner so as to form open cells, as indicated at 42, and of outer or peripheral straps 44 interconnected at their ends and connected to the outer ends of the inner straps 40 so as to add strength to the whole grid structure. The inner and outer grid straps are made of a material having a low neutron-capture cross-section, such as for example a zirconium alloy known as Zircaloy, and they are provided with detents, such as detents 46 and 48 (see FIGS. 3 and 4), which project from the various cell-defining strap portions, or cell walls, into the respective cells 42 so as to resiliently engage and laterally support the fuel rods, such as fuel rod 18, inserted therein. The spacing between the detents on each pair of strap portions forming oppositely disposed walls of a cell 42 is somewhat less than the outer diameter of the fuel rod to be received in the cell, the difference being accommodated, upon insertion of the fuel rod, due to resilience of the detent or detents on one of the respective pair of oppositely disposed cell walls or, if only relatively stiff detents are employed, by the resilience of the strap portions themselves.

As noted earlier herein, the detents in the fuel-rod receiving cells of a support grid may take various forms. In the embodiment illustrated, they consist of elongate springs 46 and relatively rigid dimples 48 formed out of the grid straps, each cell-defining strap portion having thereon one elongate spring 46 which projects into the cell 42 located on one side of the strap portion, and a pair of dimples 48 which are located adjacent the opposite ends of the elongate spring 46 and project into the cell 42 located on the other side of the same strap portion. Thus, each grid cell 42 has associated therewith two resilient springs 46 projecting from two cell walls located adjacent each other, and four relatively stiff dimples 48 arranged in two pairs projecting from the two remaining cell walls opposite the spring-bearing walls, so that there are altogether six detents 46, 48 per grid cell 42 to engage and bear against the fuel rod 18 extending through the cell. The springs 46 and the dimples 48 are elongate and generally trapezoidal, with the springs 46 oriented to extend substantially parallel to the longitudinal axes of (i.e. to the coolant-flow direction through) the cells 42, as seen best from FIG. 4, and with the dimples 48 oriented to extend transversely of said longitudinal axes and said coolant-flow direction, as seen best from FIG. 3. There are other known grid designs (not shown) which have the dimples as well as the springs oriented in parallel to the longitudinal axes of the grid cells.

As seen from FIGS. 3 and 4, the support grid 16 partially illustrated therein includes mixing vanes 50 which extend from upper (i.e. downstream, with regard to the coolant flow direction) edge portions of the grid straps 40, 44, and have the function of promoting the mixing of coolant flow along the fuel rods in order to avoid local hot-spot conditions and to average the enthalpy rise in order to maximize power output, as well known in the art and as described, for example, in U.S. Pat. No. 3,395,077 to Long Sun Ton et al.

Usually, fuel rods are loaded into a fuel assembly from its top end, either by pulling them from the bottom end of the fuel assembly or by pushing them from its top end, depending primarily upon whether the fuel assembly is readily accessible from either end, as during manufacture of a new fuel assembly, or is readily accessible only from the top, as during reconstitution or reassembly of a fuel assembly standing upright in a submerged work station. It should be noted in this context that terms such as "top", "bottom", "upper", "lower" and the like are generally used herein with reference to the operational or upright position of the fuel assembly rather than necessarily the disposition in which the fuel assembly might be held during a fuel-rod loading operation.

Figure 5:
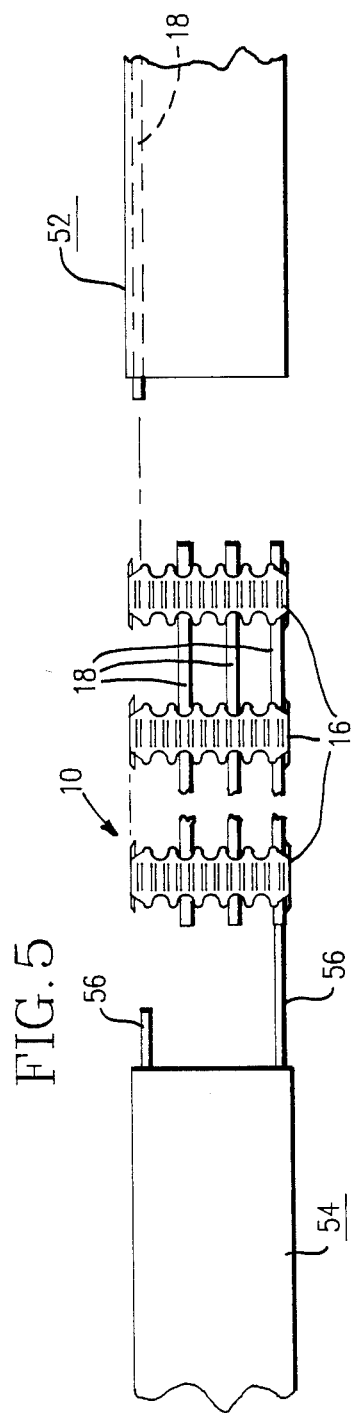
FIG. 5 schematically illustrates conventional fuel-rod loading equipment together with a fuel assembly shown, in longitudinally foreshortened form, in position for loading.
Figure 6:
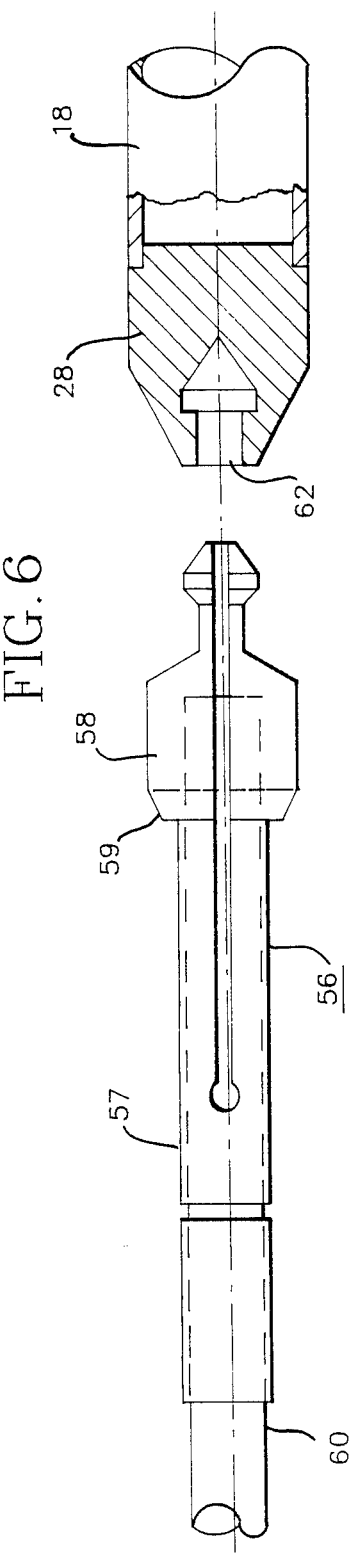
FIG. 6 is an enlarged partial view of a gripper of the fuel rod loader seen in FIG. 5, and of an end portion of a fuel rod together with an end plug shown in longitudinal section.

Referring now to FIG. 5, it schematically illustrates equipment typically employed for pulling fuel rods into a fuel assembly skeleton while the latter is supported in a prone position and with its top and bottom nozzles not yet in place. Basically, the equipment comprises a fuel rod magazine 52 for holding a complement of fuel rods (only one being indicated at 18), and a fuel rod loader 54 including at least one axially extendable and retractable gripper 56. As seen from FIG. 6, the gripper 56 comprises a sleeve 57 and an expander rod 60. The sleeve 57 is partially split longitudinally from the distal end thereof and, at the latter, has a gripping portion or gripper head 58. The expander rod 60 extends into the sleeve 57 and is axially movable therein in one direction to expand the gripper head 58, and in the opposite direction to permit elastic return of the gripper head 58 to its normal, i.e. non-expanded, condition. When in its non-expanded condition, the gripper head 58 is insertable into and withdrawable from a suitably shaped socket 62 formed in the lower end plug 28 of each fuel rod 18, as described, for example, in copending U.S. patent application, Ser. No. 797,331 of D. A. Boatwright, filed Nov. 12, 1985, and assigned to the present assignee. Operation of the expander rod 60 effecting expansion or contraction of the gripper head 58 while the latter is inserted in the socket 62 causes the gripper head to be locked to or to be released for separation from, respectively, the end plug 28 of the fuel rod 18.

The initial step of a fuel-rod loading operation resides in placing the fuel assembly 10, or rather the fuel assembly skeleton without its end structures (top and bottom nozzles), in position between the magazine 52 and the loader 54 such that its top and bottom are facing toward and are properly aligned with the magazine and the loader, respectively, as seen from FIG. 5. With the skeleton thus positioned, the gripper 56 of the loader is extended through the grid cells and into the end-plug socket 62 of the fuel rod 18 held aligned therewith in the magazine 52. Then, the expander rod 60 is operated to lock the gripper head 58 to the end plug 28, whereupon the gripper 56 is retracted so as to pull the fuel rod out of the magazine 52 and into the aligned cells of all of the support grids 16 of the fuel assembly 10. Once the fuel rod is in its fully inserted position, the expander rod 60 is operated in release the gripper for disengagement thereof from the inserted fuel rod 18. This operation is repeated until all of the fuel rods to be loaded into the fuel assembly 10 are in place.

It is during this loading operation that a fuel rod, if unprotected, is at risk of having its cladding surface scratched by the detents 46, 48 in the various grid cells, as explained hereinbefore.

Scratchless fuel rod insertion:

In accordance with the present invention, each fuel rod, during insertion thereof, is protected by means of a thin-walled metallic tubular member which has a uniform wall thickness of not more than about 0.008 inch and is positionable so as to have its wall interposed between the detents within the grid cells and the fuel rod being inserted therein.

Figure 8:
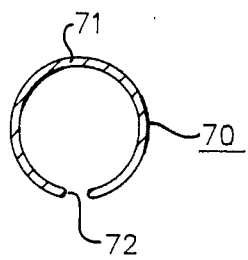
FIG. 8 is a cross-sectional view of the protective tubular member, as taken along line VIII—VIII in FIG. 7.
Figure 7:
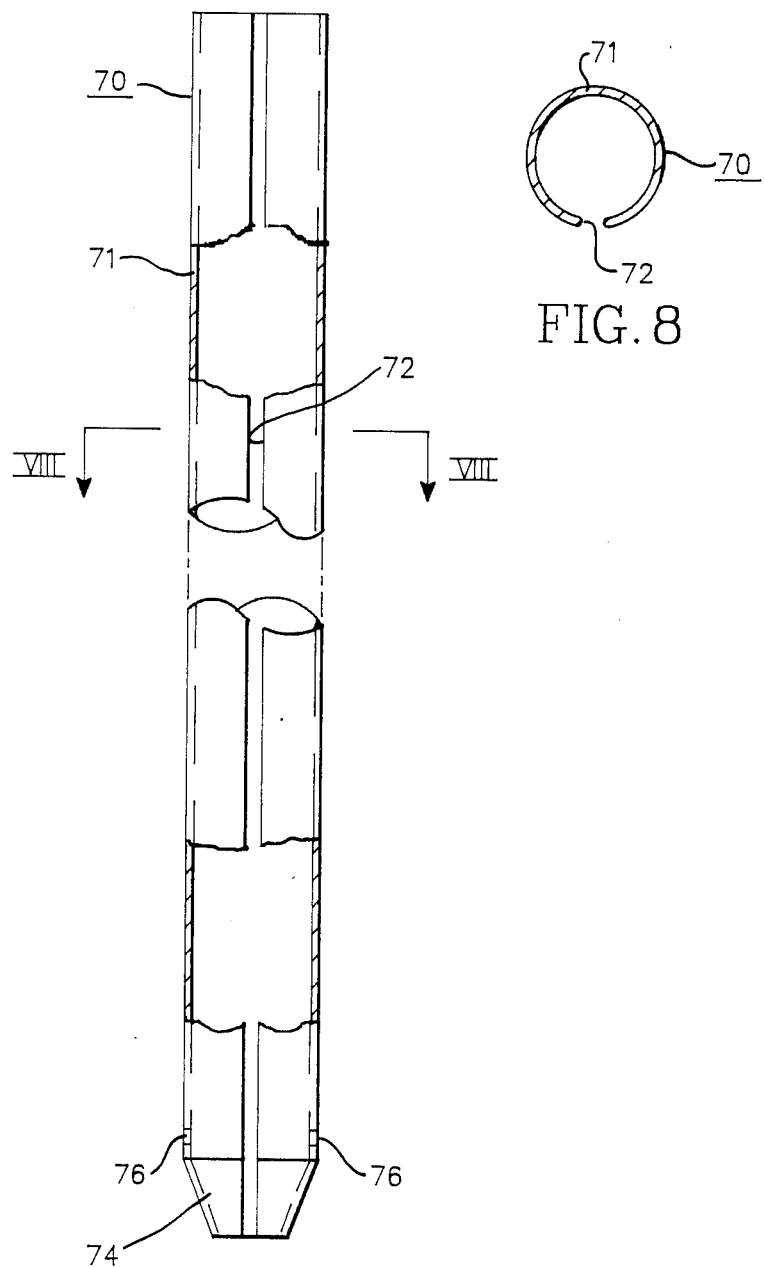
FIG. 7 is an enlarged longitudinal and partly sectioned view of a protective tubular member embodying the invention, shown in longitudinally foreshortened form.

Referring to FIGS. 7 and 8, basically, the protective tubular member comprises a thin-walled tube 70 which has an as-formed inner diameter substantially equal to the outer diameter of the fuel rod to be received, and a longitudinal slit 72 formed in its wall 71 so as to render it resiliently deflectable in a diameter-reducing sense. The slit 72, as shown in FIG. 7, extends throughout the length of the tube 70; furthermore, it has a width sufficient to permit inward deflection of the tube wall to an extent enabling the tube alone to be inserted into the grid cells essentially without causing outward deflection of the detents therein, but insufficient to permit any of the detents within the grid cells 42 to enter the slit 72. The tube 70 is of sufficient length to extend at least through a majority and preferably through all but one of the support grids of the fuel assembly to be loaded.

The thin-walled tube may be formed from any suitable metallic stock lending itself to being shaped into a longitudinally split tube having the above-mentioned characteristics, the currently preferred material being stainless steel having a thickness substantially in a range of from 0.006 to 0.008 inch (ca. 0.15 to 0.20 mm). It is noted in this context that the wall thickness of the tubular member as shown in some of the various drawings is exaggerated for the purpose of greater clarity in illustration. If desired, the inner wall surface of the tube may be coated with a suitable anti-friction material chemically compatible with the environment in which the tube is to be utilized, such as polytetrafluoroethylene, for example. In order to facilitate insertion of the thin-walled tube 70 into the cells 42 of the various grids 16, the tube 70 as shown in FIG. 7 is provided with a tapered, frusto-conical end portion 74 formed integral therewith at the end thereof which during insertion is its leading end. The tubular member also includes tube withdrawal means comprising two openings 76 formed in diametrically opposed wall portions of the tube 70 proximate to its leading end and adapted to receive a suitable withdrawal tool or implement, such as, for example, a pin 78

(see FIG. 7C) adapted to be inserted into the openings 76 and used in pulling the tubular member from the inserted fuel rod.

As mentioned hereinbefore, the longitudinal slit 72, splitting the wall 71 of the tube 70 preferably from end to end and thereby rendering it radially deflectable through application of a moderate force, enables the tube 70 to be readily inserted into grid cells 42 alone, that is to say, prior to insertion of the fuel rod. Hence, during insertion of the fuel rod, the tube 70 will serve the dual purpose of protecting mixing vanes, such as indicated at 50 in FIGS. 3 and 4, from being bumped and damaged by the fuel rod, and of protecting the fuel rod from being scratched by the detents 46, 48 within the grid cells 42.

Referring now to FIGS. 7A–C in which reference characters 16a and 16z designate the uppermost grid and the lowermost grid, respectively, of the fuel assembly 10 (FIG. 1), the protective tubular member or tube 70 is shown in FIG. 7A as inserted in the grids 16 and ready to receive a fuel rod 18 from the magazine 52 (FIG. 5). To load the fuel rod 18 into the grids 16, the gripper 56 is extended axially through the protective tube 70, as indicated in FIG. 7A by an arrow, is engaged with and locked to the lower end plug 28 of the fuel rod 18, and then is retracted so as to pull the latter into the tube 70, during which movement the wall 71 of the tube 70 will protect the fuel rod from being scratched by the detents 46, 48 within the grid cells 42.

When the fuel rod 18 has reached its fully inserted position, as shown in FIG. 7B, it is suitably restrained from further movement while the protective tube 70 is advanced, such as by being pushed from the top, far enough to render the openings 76 near its leading end accessible, as seen from FIG. 7C, for engagement thereof with the above-mentioned tube withdrawal implement or pin 78 which then is used to pull the protective tube 70 off the fuel rod 18. Disengagement and full retraction of the gripper 56 may be effected either after utilizing the gripper for holding the fuel rod 18 in its inserted position during withdrawal of the protective tube 70, or immediately after arrival of the fuel rod 18 in its inserted position in which event the fuel rod 18 is restrained in another suitable manner, such as, for example, by means of a holding implement (not shown) engaged with the upper end plug 26 or one held axially against the lower end plug of the inserted fuel rod 18.

Figure 9:
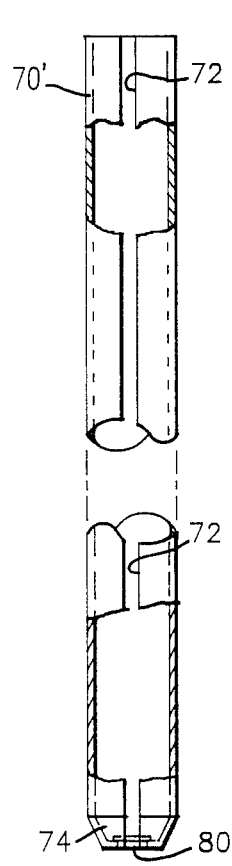
FIG. 9 is a longitudinal and partly sectioned view of a modification of the protective tubular member, shown in longitudinally foreshortened form.
Figure 9A:
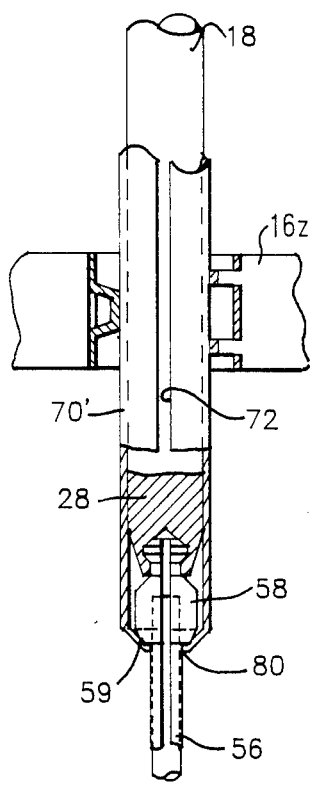
FIGS. 9A–B schematically depict different phases in utilizing the protective tubular member of FIG. 9 for inserting a fuel rod into the fuel assembly grids, only the lowermost one of which is indicated.
Figure 9B:
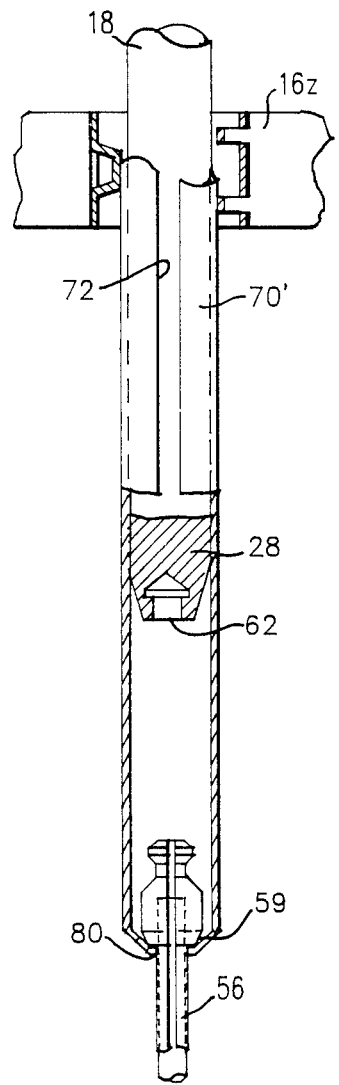

Referring now to FIG. 9 which shows a modification of the protective tubular member, the latter as illustrated therein comprises a split tube 70' similar in every respect to the one just described, except that the tube 70' has no openings for receiving a tube withdrawal tool and instead has its tapered end portion 74 terminating in an in-turned lip 80 which, in cooperation with a shoulder 59 (see FIG. 6) formed on the gripper 56 at the juncture between the gripper head 58 and the sleeve 57, serves as the means for withdrawing the protective tube 70' from an inserted fuel rod. More specifically, the in-turned lip 80 is dimensioned such as, during initial extension of the gripper 56 into the protective tube 70', to be engaged and resiliently cammed aside by the entering gripper head 58, and then to resiliently snap back to its natural position in which it is subsequently engaged by the shoulder 59 (FIG. 6) on the gripper head 58 when the gripper 56 is retracted and has pulled the fuel rod 18 to its fully inserted position, as shown in FIG. 9A. Once the fuel rod 18 has reached this fully inserted position, the gripper 56 is operated to release its head 58 for withdrawal from the socket 62 in the lower end plug 28 of the inserted fuel rod 18, whereupon retraction of the gripper 56 is continued, as shown in FIG. 9B, thereby causing the shoulder 59 on the gripper head, in cooperation with the in-turned lip 80 of the protective tube 70', to pull the latter from the inserted fuel rod 18 whilst the fuel rod is suitably retained in its inserted position, for instance by means of the previously mentioned implement (not shown) engaged with the upper end plug of the fuel rod 18.

A further modification of the protective tubular member embodying the invention is illustrated in FIG. 10 wherein the tubular member again comprises a thin-walled tube 70" which is similar in every respect to the thin-walled tube 70 of FIGS. 7-8, except that the tube 70" has no tapered end portion and has a substantially uniform diameter throughout its length. Consequently, the protective tube 70" is particularly suitable for use with fuel assemblies which are not readily accessible from the bottom and, therefore, require the protective tube to be withdrawn from the top. In order to minimize the chance of the tube's getting caught on any of the detents within the grid cells during insertion therein, the tube 70" preferably is provided with a chamfer 85 formed at the edge thereof which is its leading edge during insertion. The means for withdrawing the protective tube 70" from an inserted fuel rod is shown in FIG. 10 to comprise a generally L-shaped slot 84 which is formed in a wall portion of the tube 70" adjacent the end thereof which is the leading end of the tube during its withdrawal, one leg of the L-shaped slot 84 extending into the tube wall in a direction generally parallel to the longitudinal slit 72, and the other leg of the L-shaped slot 84 extending partly circumferentially of the tube 70" and preferably terminating in an up-turned toe portion, as seen best from FIG. 11. The L-shaped slot 84 is adapted to receive a radial pin 88 on a lower end portion 86 of a long-handled tool 85 which is partially insertable into the slit tube 70". In order to facilitate entry of the radial pin 88 into the L-shaped slot 84, the latter preferably is flared outward at the entrance thereof, as seen from FIG. 11.

Figures 10A, 10B, 10C:
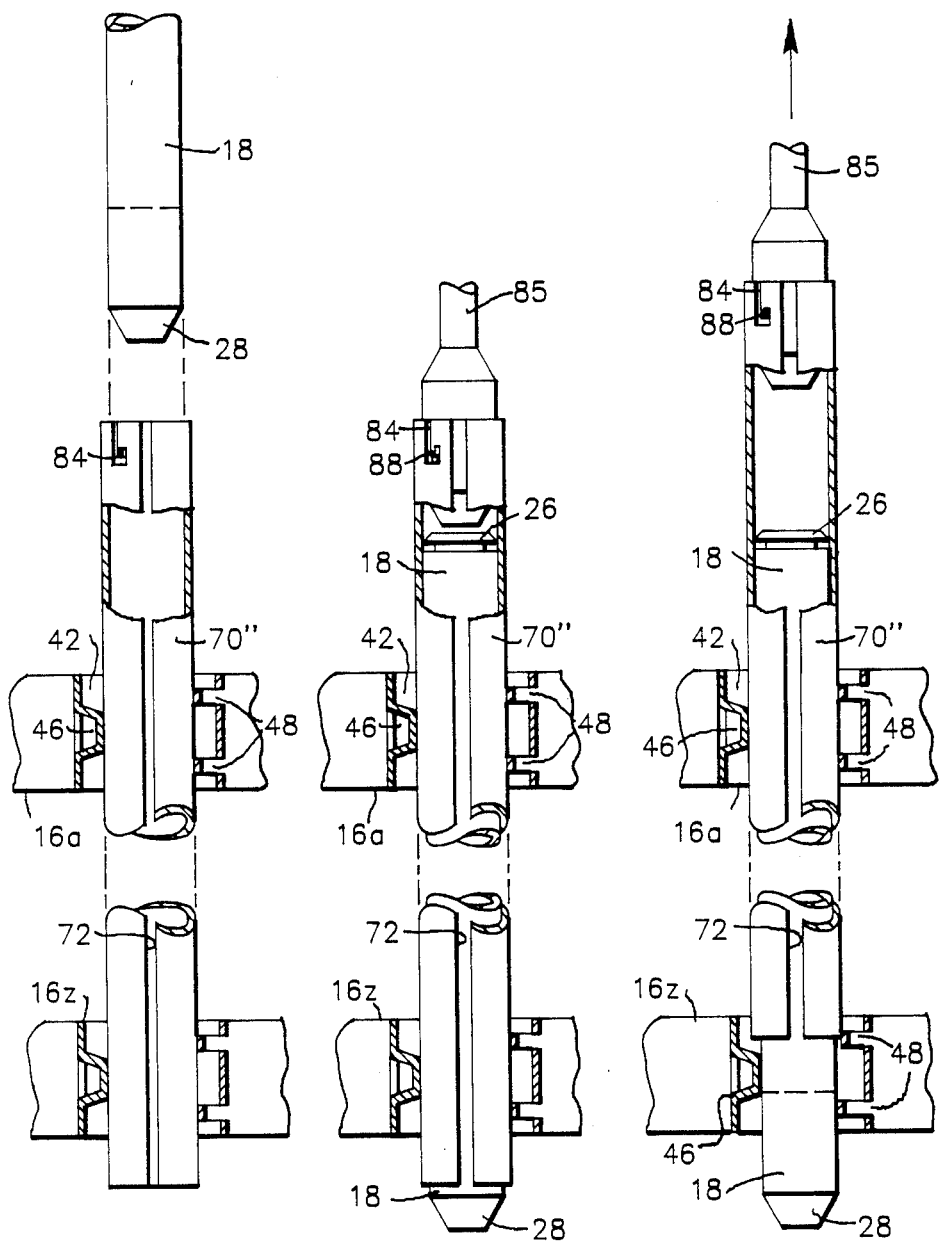
FIGS. 10A–C schematically depict different phases in utilizing the protective tubular member of FIG. 10 for inserting a fuel rod into the fuel assembly grids, only the uppermost and lowermost ones of which are indicated.

Referring to FIGS. 10A–C, the protective tubular member 70" is shown in FIG. 10A as inserted into the grids of the fuel assembly and ready to receive a fuel rod 18. If the fuel assembly were readily accessible from the bottom the fuel rod 18 could be pulled into the slit tube 70" in the same manner as described hereinbefore. However, it is assumed that the fuel assembly is not readily accessible from the bottom and that, therefore, the fuel rod 18 must be pushed into the protective tube 70" from the top. This can be done in any suitable manner known to the art, and may be done by utilizing the long-handled tool 85 as a push-rod.

Once the fuel rod 18 has been inserted into the protective tube 70", the lower end portion 86 of the long-handled tool 85 is engaged in the upper end portion of the protective tube 70" while, at the same time, the radial pin 88 thereon is inserted into the vertical leg of the L-shaped slot 84 until it bottoms therein, whereupon the tool 85 is partially rotated to move the pin 88 into the horizontal leg of the L-shaped slot 84 and to the end thereof where it is aligned with the up-turned toe portion of the slot, as seen from FIG. 10B. With the tool 85 thus connected to the protective tube 70", it is retracted so as to pull the tube 70" from the inserted fuel rod 18, as depicted in FIG. 10C, while the fuel rod is being restrained in a suitable manner, for instance by means of an elongate restraining element (not shown) incorporated in the long-handled tool 85 and slideably supported therein such that it can be held restrainingly engaged with the upper end plug 26 of the inserted fuel rod 18 while the tool 85 is used simultaneously to pull the protective tube 70" off the inserted fuel rod.

It should be noted that each of the protective tubular members 70, 70' and 70" described above lends itself to being inserted into the suppport grids 16 either alone, i.e. separate from and before the fuel rod, as shown herein, or simultaneously with a fuel rod while disposed thereon. If a fuel rod is to be loaded into grid cells which have mixing vanes associated therewith, it will likely be preferred to insert the protective tube before the fuel rod in order to protect the mixing vanes from being damaged through contact with the fuel rod, as explained hereinbefore. Insertion of each protective tubular member 70, 70' or 70" along may be effected by suitably guiding and pushing, or pulling, the tubular member into the selected cells 42 of the grids 16; if to be pulled, a similar technique may be employed as used in pulling the tubular member off an inserted fuel rod, as set forth above with particular reference to FIG. 7C, 9B or FIG. 10C, respectively.

Turning now to FIGS. 12 and 12A-C, they illustrate an embodiment wherein the protective tubular member is adapted for insertion thereof together and simultaneously with a fuel rod. As seen best from FIG. 12, the protective tubular member comprises a thin-walled tube 90 for receiving a fuel rod, and means 94 both for pulling the tubular member, together with the fuel rod disposed within the tube 90, into the grids 16 (FIG. 1) of the fuel assembly 10, and for withdrawing the protective tubular member from the fuel rod after insertion thereof. The thin-walled tube 90 corresponds essentially to the tube 70" shown in FIG. 10 in that it has a longitudinal slit 92 formed in its wall and is of uniform diameter throughout its length. The means 94 for inserting the protective tubular member together with the fuel rod, and for subsequently withdrawing the tubular member from the inserted fuel rod, comprises an end plug 94 secured to the tube 90 at the end thereof which is its leading end during insertion into the grids. The end plug 94 is similar to the fuel-rod end plug 28 shown in FIG. 6 in that it is tapered and has formed therein a socket 96 adapted to be engaged with the gripper head 58, and it may be secured to the thin-walled tube 92 in the same conventional manner as employed in securing the end plug 28 to the cladding tube of the fuel rod.

Figure 12:
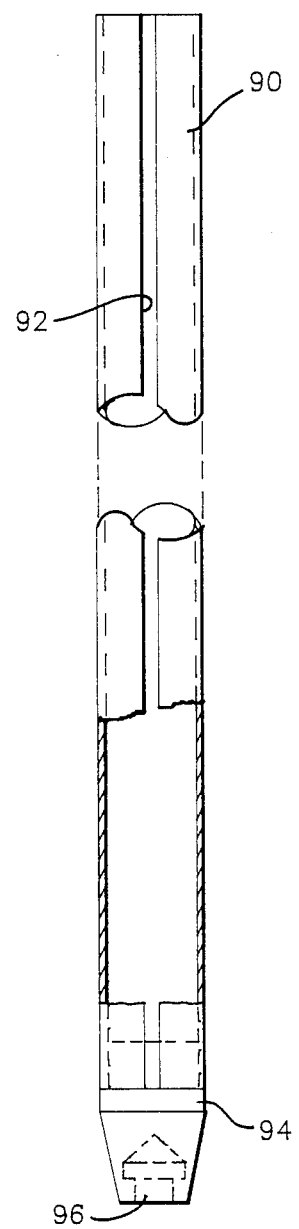
FIG. 12 is a view similar to FIG. 7 but showing still a further modification of the protective tubular member.

The initial step in utilizing the protective tubular member of FIG. 12 is to mount the latter telescopically upon the fuel rod 18 to be inserted, followed by a fuel-rod loading operation the same as initially described herein with respect to FIG. 5, except that now the gripper head 58 of the extended gripper 56 is engaged with the end plug 94 of the protective tubular member 90 (see FIG. 12A) instead of with the lower end plug 28 of the fuel rod 18. Upon retraction of the gripper 56, the protective tubular member, together with the fuel rod 18 disposed within the thin-walled tube 90, is pulled into the cells 42 of the successive grids 16 until it reaches the fuel rod fully inserted position shown in FIG. 12B, whereupon the fuel rod 18 is restrained from further movement while the gripper 56 and the protective tubular member 90 still locked thereto continue to be retracted, thereby to pull the protective tubular member from the inserted fuel rod 18, as depicted in FIG. 12C.

In this case as in the preceding ones, restraint for the inserted fuel rod against further movement thereof while the protective tubular member is being withdrawn may be provided by any suitable means, such as the previously mentioned tool or implement (not shown) adapted to be restrainingly engaged with the upper end plug of the inserted fuel rod. Such tool or implement may be of a kind to be manipulated manually or it may be one which, for instance, is supported from the fuel-rod magazine 52 (FIG. 5) and adapted to restrainingly engage the upper end plug of the fuel rod automatically as the latter leaves the magazine and reaches its fully inserted position within the fuel assembly 10.

Additionally or alternatively, such restraint may also be provided by arranging for the protective tubular member 70, 70', 70" or 90 to extend, when in the fuel-rod inserted position, through all of the support grids 16 of the fuel assembly except the end grid 16a or 16z which is nearest the end of the protective tubular member representing its trailing end during withdrawal of the tubular member from the inserted fuel rod. With each of the arrangements as depicted in FIGS. 7A-C, 9A-B and 12A-C, wherein the respective tubular members 70, 70' and 90 are withdrawn downwardly, the end grid nearest said trailing end of the tubular member is the uppermost grid 16a, whereas with the arrangement as depicted in FIGS. 10A-C, wherein withdrawal of the tubular member 70" occurs in the upward direction, the end grid nearest said trailing end of the tubular member 70" is the lowermost grid 16z.

Figures 12A, 12B, 12C:
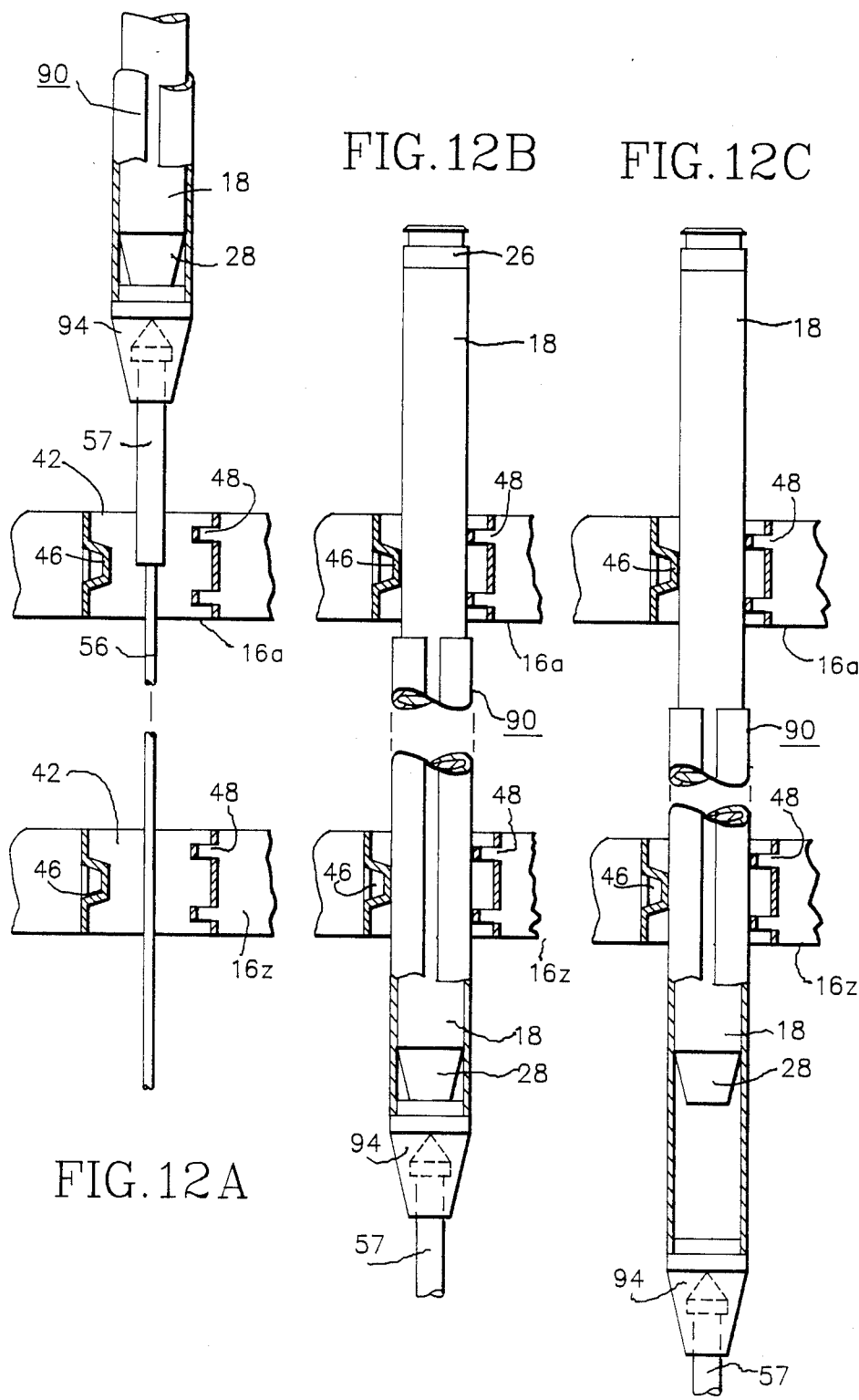
FIGS. 12A–C schematically depict different phases in utilizing the protective tubular member of FIG. 12 for inserting a fuel rod into the fuel assembly grids, only the uppermost and lowermost ones of which are indicated.

This step of leaving an end portion of the fully inserted fuel rod exposed may be employed with any of the schemes disclosed herein but is illustrated, by way of example, only in connection with the embodiment shown in FIGS. 12A to 12C. As seen best from FIG. 12B, the protective tube 90 has a length such as to leave the upper end portion of the fuel rod 18 exposed. Thus, as the protective tube 90 together with the fuel rod therein approaches the fully inserted position during insertion, its upper end will ride off the detents 46,48 within the cell 42 of the uppermost grid 16a. This enables the detents 46,48 to frictionally engage the bare end portion of the fuel rod 18 and to apply thereto a restraining force which will cause the movement of the fuel rod to be arrested even as the gripper 56 and the protective tubular member 90 still connected thereto continue to be retracted. In this manner, the insertion of the fuel rod and the withdrawal of the protective tubular member from the inserted fuel rod can be effected in one continuous operation. It is believed that leaving an end portion of the fuel rod 18 thus exposed during insertion is not likely to result in any objectionable scratching of its cladding surface since the bare end portion will come into direct moving contact with the detents of only one grid cell, and movement of the fuel rod relative to the detents will cease almost immediately after such direct contact has been established.

Although each of the foregoing embodiments has been described with respect to only one protective tubular member 70, 70', 70" or 90, and even though it is possible of course to use a single protective tubular member repeatedly for loading several fuel rods in succession, it will be appreciated that in practice it may well be found more expedient to employ a separate protective tubular member individually for each of a plurality of fuel rods. Thus, protective tubes such as the one shown in FIGS. 7-8, FIG. 9, FIG. 10 or FIG. 12 may be placed one on each of a whole complement of fuel rods stored in the magazine 52 (FIG. 5) and to be loaded into the fuel assembly 10. Alternatively, a whole complement of protective tubular members such as the one shown in FIGS. 7-8, FIG. 9 or FIG. 10 may be inserted into the grids 16 of the fuel assembly 10 for having fuel rods subsequently loaded therein. This latter approach offers a particular advantage if practiced with the kind of protective tube illustrated in FIG. 10, and in conjunction with a new fuel assembly skeleton being prepared for shipment to, and subsequent loading with fuel rods at, a nuclear power plant.

Where protective tubes can or must be inserted and withdrawn from the same end of a fuel assembly, such as the top, it may be desirable to cluster several of the tubes, for instance by supporting them from a common plate (not shown) having the ends of the protective tubes connected thereto and having apertures for enabling fuel rods to be inserted therethrough and into the respective tubes. Preferably, such plate would include means engageable with suitable retraction apparatus (not shown) for withdrawing the plate, together with the protective tubes connected thereto, upon completed insertion of the fuel rods.

Finally, it will be appreciated that even though the invention has been described herein in conjunction with a fuel assembly designed for use in a pressurized water reactor, it is applicable just as well with respect to fuel bundles for boiling water reactors.

We claim:

1. For use with a nuclear fuel assembly including a plurality of support grids having cells for receiving fuel rods and with detents disposed within the respective cells for resiliently engaging and laterally supporting the fuel rods received therein, an apparatus for facilitating scratchless insertion of each fuel rod into cells of said support grids, said apparatus comprising:
a thin-walled metallic tubular member which is long enough to extend through at least a majority of said plurality of support grids, and is positionable so as to have its thin wall interposed, during insertion of each fuel rod, between the latter and the detents within the cells receiving it, said thin-walled tubular member having a substantially uniform wall thickness of not more than about 0.008 inch, an as-formed inner diameter substantially equal to the outer diameter of said fuel rod, and a longitudinal slit formed in the wall of the tubular member so as to render said wall resiliently deflectable in a diameter-reducing sense, said longitudinal slit having a width sufficient to preclude overlapping of the edges of said wall along the slit, and insufficient for any of said detents to enter the slit when the wall of the tubular member is in position between said detents and said fuel rod.

2. Apparatus according to claim 1, wherein said longitudinal slit extends throughout the length of the tubular member.

3. Apparatus according to claim 1, wherein said tubular member has a length sufficient to extend at least through all but one of the support grids when positioned in said cells.

4. Apparatus according to claim 1, wherein said tubular member is of sufficient length to extend through all of the grids when positioned in said cells.

5. Apparatus according to claim 1, wherein said tubular member has a wall thickness substantially of from 0.15mm to 0.20mm.

6. Apparatus according to claim 1, wherein said tubular member consists of stainless steel.

7. Apparatus according to claim 1, wherein said tubular member has an anti-friction material disposed on the inner wall surface thereof.

8. Apparatus according to claim 1, wherein said tubular member includes tube withdrawal means adapted to be engaged with an implement for withdrawing the tubular member from the inserted fuel rod.

9. Apparatus according to claim 8, wherein said tube withdrawal means comprises openings formed in the wall of the tubular member proximate to the end of the latter which is its leading end during withdrawal of the tubular member from the inserted fuel rod.

10. Apparatus according to claim 1, wherein said tubular member has a uniform diameter throughout its length.

11. Apparatus according to claim 10, wherein said tubular member has a chamfer formed adjacent the end thereof which is its leading end during insertion of the tubular member into said cells of the grids.

12. Apparatus according to claim 1, wherein said tubular member has a frusto-conical end portion disposed at the end thereof which is its leading end during insertion of the tubular member into said cells of the grids.

13. Apparatus according to claim 11, wherein said frusto-conical end portion terminates in an in-turned lip engageable with an implement for withdrawing the tubular member from the inserted fuel rod.

14. Apparatus according to claim 1, wherein said tubular member includes a frusto-conical end plug secured to one end thereof and having means adapted to be engaged with a tube inserting and withdrawal tool.

* * * * *